(12) United States Patent
Zuo

(10) Patent No.: US 11,108,545 B2
(45) Date of Patent: Aug. 31, 2021

(54) CREATING A BLOCKCHAIN ACCOUNT AND VERIFYING BLOCKCHAIN TRANSACTIONS

(71) Applicant: ADVANCED NEW TECHNOLOGIES CO., LTD., George Town (KY)

(72) Inventor: Jun Zuo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,328

(22) Filed: Jan. 31, 2020

(65) Prior Publication Data

US 2020/0169389 A1 May 28, 2020

Related U.S. Application Data

(63) Continuation of application No. PCT/CN2020/071142, filed on Jan. 9, 2020.

(30) Foreign Application Priority Data

May 31, 2019 (CN) .......................... 201910470043.9

(51) Int. Cl.
*H04L 9/06* (2006.01)
*H04L 9/30* (2006.01)

(52) U.S. Cl.
CPC .......... *H04L 9/0637* (2013.01); *H04L 9/0643* (2013.01); *H04L 9/30* (2013.01); *H04L 2209/38* (2013.01)

(58) Field of Classification Search
CPC ....... H04L 9/0637; H04L 9/0643; H04L 9/30; H04L 2209/38

(Continued)

(56) References Cited

U.S. PATENT DOCUMENTS 5,757,915 A * 5/1998 Aucsmith ............... G06F 21/51
713/167
6,085,298 A * 7/2000 Ohran ................ G06F 11/1451
711/154

(Continued)

FOREIGN PATENT DOCUMENTS

CN        105429752        3/2016
CN        106055597        10/2016

(Continued)

OTHER PUBLICATIONS

Yeh, Lo-Yao, Peggy Joy Lu, and Jen-Wei Hu. "NCHC blockchain construction platform (NBCP): rapidly constructing blockchain nodes around Taiwan." In 2017 ACM/IEEE Joint Conference on Digital Libraries (JCDL), pp. 1-2. IEEE, 2017. (Year: 2017).*

(Continued)

*Primary Examiner* — Luu T Pham
*Assistant Examiner* — Walter J Malinowski
(74) *Attorney, Agent, or Firm* — Fish & Richardson P.C.

(57) ABSTRACT

Implementations of this specification provide a method and an apparatus for creating a blockchain account and verifying blockchain transactions. An example method performed by a blockchain platform includes receiving a transaction, the transaction including at least an initiator field that specifies an account to be created, a receiver field that specifies a pre-determined field value, and a data field that specifies a user-defined key control rule. The user-defined key control rule includes at least one 3-tuple, and each 3-tuple includes a key identifier, an action identifier, and a permission setting. The blockchain platform seals the transaction into a block, and sends the sealed transaction to at least one other full node in the blockchain network.

16 Claims, 6 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 6,510,513 | B1* | 1/2003 | Danieli | G06F 21/64 |
| | | | | 380/279 |
| 6,728,723 | B1* | 4/2004 | Kathail | H04L 29/06 |
| 7,890,581 | B2* | 2/2011 | Rao | G06Q 30/08 |
| | | | | 709/204 |
| 9,461,876 | B2* | 10/2016 | Van Dusen | G06F 30/20 |
| 10,579,974 | B1* | 3/2020 | Reed | G06Q 20/065 |
| 10,911,228 | B2* | 2/2021 | Wang | H04L 9/0852 |
| 2003/0046534 | A1* | 3/2003 | Alldredge | G06Q 20/108 |
| | | | | 713/153 |
| 2003/0084291 | A1* | 5/2003 | Yamamoto | H04L 63/02 |
| | | | | 713/168 |
| 2007/0198518 | A1* | 8/2007 | Luchangco | G06F 16/2315 |
| 2011/0035480 | A1* | 2/2011 | Lyou | H04L 41/0654 |
| | | | | 709/223 |
| 2012/0110055 | A1* | 5/2012 | Van Biljon | G06Q 30/04 |
| | | | | 709/201 |
| 2012/0246098 | A1* | 9/2012 | Chari | G06N 20/00 |
| | | | | 706/12 |
| 2012/0317609 | A1* | 12/2012 | Carrara | G06F 21/6218 |
| | | | | 726/1 |
| 2014/0019764 | A1* | 1/2014 | Gopal | H04L 9/3247 |
| | | | | 713/176 |
| 2015/0052359 | A1* | 2/2015 | Castillo | H04L 63/061 |
| | | | | 713/171 |
| 2016/0080336 | A1* | 3/2016 | Ryan | H04L 9/0891 |
| | | | | 713/171 |
| 2016/0226868 | A1* | 8/2016 | Harding | H04L 9/3231 |
| 2016/0294783 | A1* | 10/2016 | Piqueras Jover | H04L 63/0442 |
| 2018/0011893 | A1* | 1/2018 | Kimura | G06F 12/0238 |
| 2018/0068130 | A1* | 3/2018 | Chan | G06F 21/64 |
| 2018/0091516 | A1* | 3/2018 | Nixon | H04L 63/20 |
| 2018/0097779 | A1* | 4/2018 | Karame | H04L 9/3236 |
| 2018/0285217 | A1* | 10/2018 | Smith | G06F 21/00 |
| 2018/0332087 | A1* | 11/2018 | Paduroiu | H04L 65/607 |
| 2019/0050855 | A1* | 2/2019 | Martino | G06F 16/27 |
| 2019/0197534 | A1* | 6/2019 | Alastair | H04L 9/32 |
| 2019/0207748 | A1* | 7/2019 | Courtney | H04L 9/0637 |
| 2019/0213346 | A1* | 7/2019 | Friedman | G06F 21/604 |
| 2019/0215149 | A1* | 7/2019 | Ramasamy | H04L 67/1036 |
| 2019/0236365 | A1* | 8/2019 | Speasl | G06K 9/00691 |
| 2019/0238316 | A1* | 8/2019 | Padmanabhan | H04L 9/0637 |
| 2019/0268153 | A1* | 8/2019 | Kurian | H04L 9/3247 |
| 2019/0303939 | A1* | 10/2019 | Kurian | G06Q 20/382 |
| 2019/0311352 | A1* | 10/2019 | Lui | G06Q 20/06 |
| 2019/0311358 | A1* | 10/2019 | Bhagavatha | G06Q 20/0655 |
| 2019/0317924 | A1* | 10/2019 | Alimi | H04L 9/0891 |
| 2019/0318327 | A1* | 10/2019 | Sowell | G06F 9/5055 |
| 2019/0325430 | A1* | 10/2019 | Cui | H04L 9/3247 |
| 2019/0334716 | A1* | 10/2019 | Kocsis | H04L 63/0442 |
| 2019/0379699 | A1* | 12/2019 | Katragadda | H04L 63/1425 |
| 2019/0385183 | A1* | 12/2019 | Ryu | H04L 9/0637 |
| 2020/0034356 | A1* | 1/2020 | Yu | G06F 16/24 |
| 2020/0034804 | A1* | 1/2020 | Mousko | G06Q 30/06 |
| 2020/0034888 | A1* | 1/2020 | Soundararajan | G06Q 20/065 |
| 2020/0034945 | A1* | 1/2020 | Soundararajan | H04L 9/3247 |
| 2020/0065763 | A1* | 2/2020 | Rosinzonsky | G06Q 10/10 |
| 2020/0082405 | A1* | 3/2020 | Li | H04L 9/0643 |
| 2020/0134601 | A1* | 4/2020 | Ding | G06Q 20/3224 |
| 2020/0250174 | A1* | 8/2020 | Padmanabhan | G06F 16/2365 |
| 2020/0252404 | A1* | 8/2020 | Padmanabhan | H04L 63/101 |
| 2020/0412554 | A1* | 12/2020 | Lee | H04L 9/30 |
| 2021/0150519 | A1* | 5/2021 | Wang | H04L 9/0637 |

FOREIGN PATENT DOCUMENTS

| | | | |
|---|---|---|---|
| CN | 106960166 A | * | 7/2017 |
| CN | 107911216 | | 4/2018 |
| CN | 107944255 | | 4/2018 |
| CN | 108769038 | | 11/2018 |
| CN | 109583887 | | 4/2019 |
| CN | 109598504 | | 4/2019 |
| CN | 109598504 A | * | 4/2019 |
| CN | 109598598 | | 4/2019 |
| CN | 110264354 | | 9/2019 |
| TW | 201826772 | | 7/2018 |
| WO | WO 2018189656 | | 10/2018 |

OTHER PUBLICATIONS

Yu, Shitang, Kun Lv, Zhou Shao, Yingcheng Guo, Jun Zou, and Bo Zhang. "A high performance blockchain platform for intelligent devices." In 2018 1st IEEE international conference on hot information-centric networking (HotICN), pp. 260-261. IEEE, 2018. (Year: 2018).*

El-Hindi, Muhammad, Carsten Binnig, Arvind Arasu, Donald Kossmann, and Ravi Ramamurthy. "BlockchainDB: A shared database on blockchains." Proceedings of the VLDB Endowment 12, No. 11 (2019): 1597-1609. (Year: 2019).*

Yuan, Chao, Mixue Xu, Xueming Si, and Bin Li. "Blockchain with accountable CP-ABE: How to effectively protect the electronic documents." In 2017 IEEE 23rd international conference on parallel and distributed systems (ICPADS), pp. 800-803. IEEE, 2017. (Year: 2017).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report and Written Opinion in PCT Appln No. PCT/CN2020/071142, dated Apr. 9, 2020, 20 pages (with English translation).

* cited by examiner

CREATING A BLOCKCHAIN ACCOUNT AND VERIFYING BLOCKCHAIN TRANSACTIONS

CROSS-REFERENCE TO RELATED APPLICATIONS

This application is a continuation of PCT Application No. PCT/CN2020/071142, filed on Jan. 9, 2020, which claims priority to Chinese Patent Application No. 201910470043.9, filed on May 31, 2019, and each application is hereby incorporated by reference in its entirety.

TECHNICAL FIELD

One or more implementations of the present specification relate to the field of blockchain technologies, and in particular to, a method and a device for creating a blockchain account based on key access control, and a method and a device for verifying a blockchain transaction.

BACKGROUND

In a next generation blockchain (for example, Ethereum blockchain), a concept of account is added, and a user can create an account on a blockchain platform. In such a scenario, the blockchain platform serves as a full node in a blockchain network, and an account created by a user is an external account in the Ethereum blockchain. In each full node of a blockchain network, data of all accounts in the blockchain is maintained in a local database of a node in a form of a state tree, the state tree is a mapping between account addresses and account content, and the account content includes an account balance, account key information (hash value), etc.

Currently, only some blockchain platforms, each account may have a plurality of key pairs, where each key pair includes one public key and one private key, the private key can be used to add a digital signature, and the public key can be used to verify the signature. How to manage and perform access control on keys when there are a plurality of key pairs to further ensure transaction security in a blockchain becomes a problem that needs to be urgently resolved.

SUMMARY

One or more implementations of the present application describe a method and a device for creating a blockchain account and a method and a device for verifying a blockchain transaction, where a key control rule can be defined during account creation, and a transaction is verified based on the key control rule, to implement key access control and improve transaction security.

According to a first aspect, a method for creating a blockchain account is provided, where the method is performed by a blockchain platform serving as a full node in a blockchain network and includes: receiving a first transaction used by a user to create an account, where the first transaction includes at least an initiator field, a receiver field, and a data field, the initiator field specifies a first account to be created, the receiver field specifies a pre-determined field value, and the data field specifies a user-defined key control rule, the key control rule includes at least one 3-tuple, and each 3-tuple includes a key identifier, an action identifier, and a permission setting; and sealing the first transaction into a block, and sending the sealed first transaction to at least one of other full nodes in the blockchain network.

In an implementation, receiving a first transaction used by a user to create an account includes: receiving the first transaction from a client; or receiving the first transaction from another node in the blockchain network.

According to an implementation, the method according to the first aspect further includes: adding account content corresponding to an account identifier of the first account to a local account database, where account content includes the key control rule.

In an implementation, the key identifier in the 3-tuple is used to identify a key pair, the key pair includes one corresponding public key and one corresponding private key, and the key identifier is generated based on the public key.

According to an implementation, the key control rule is in a format specified by a pre-determined coding scheme.

According to a second aspect, a method for creating a blockchain account is provided, where the method is performed by a client, the client is connected to a blockchain platform serving as a full node in a blockchain network, and the method includes: receiving an account creation request of a user, where the account creation request includes a key control rule defined by the user, and the key control rule includes at least one 3-tuple, and each 3-tuple includes a key identifier, an action identifier, and a permission setting; and sending a first transaction used to create an account, where the first transaction includes at least an initiator field, a receiver field, and a data field, the initiator field specifies a first account to be created, the receiver field specifies a pre-determined field value, and the data field specifies the key control rule.

In an implementation of the second aspect, before sending a first transaction used to create an account, the method further includes: coding the key control rule by following a pre-determined coding scheme; and fill the data field of the first transaction with the coded data in a pre-determined format.

According to a third aspect, a method for verifying a blockchain transaction is provided, where the method is performed by a blockchain platform serving as a full node in a blockchain network and includes: receiving a second transaction, where the second transaction includes at least an initiator field and an extension field, the initiator field specifies a first account, and the extension field specifies a first-action identifier corresponding to a first action involved in the second transaction; obtaining a key control rule defined during creation of the first account, where the key control rule includes at least one 3-tuple, and each 3-tuple includes a key identifier, an action identifier, and a permission setting; determining a first 3-tuple corresponding to the first-action identifier based on the key control rule; and verifying the second transaction based on at least the first 3-tuple.

In an implementation, receiving a second transaction includes: receiving the second transaction from a client; or receiving the second transaction from another node in the blockchain network.

According to an implementation, obtaining a key control rule includes: obtaining, from a blockchain, a first transaction that has been previously used to create the first account, and reading the key control rule from a data field of the first transaction; or reading account content corresponding to an account identifier of the first account from a local account database, where account content includes the key control rule.

In an implementation of the third aspect, verifying the second transaction includes: verifying the extension field based on the first 3-tuple; and when the extension field is verified successfully, verifying the first action based on the first 3-tuple.

In a further implementation, verifying the extension field can include: obtaining a first public key corresponding to a first public key identifier in a first 3-tuple; and verifying a field signature in the extension field by using the first public key.

Still further, verifying the field signature by using the first public key can include: calculating a first digest of the first-action identifier and the extension data; encrypting the field signature by using the first public key, to obtain a second digest; and comparing the first digest and the second digest, and determining that the field signature is verified successfully when the first digest and the second digest are the same.

According to an implementation of the third aspect, verifying the first action based on the first 3-tuple can include: obtaining permission setting content in the first 3-tuple; and when the permission setting content indicates that the first action is not permitted, determining that the first action fails to be verified and that the second transaction fails to be verified.

In an implementation, the method according to the third aspect further includes: when the second transaction fails to be verified, returning prompt information to the client that initiates the second transaction.

According to a fourth aspect, a device for creating a blockchain account is provided, where the device is deployed on a blockchain platform, the blockchain platform serves as a full node in a blockchain network, and the device includes: a first-transaction receiving unit, configured to receive a first transaction used by a user to create an account, where the first transaction includes at least an initiator field, a receiver field, and a data field, the initiator field specifies a first account to be created, the receiver field specifies a pre-determined field value, and the data field specifies a user-defined key control rule, the key control rule includes at least one 3-tuple, and each 3-tuple includes a key identifier, an action identifier, and a permission setting; and a block forming unit, configured to seal the first transaction into a block, and send the sealed first transaction to at least one of other full nodes in the blockchain network.

According to a fifth aspect, a device for creating a blockchain account is provided, where the device is deployed at a client, the client is connected to a blockchain platform serving as a full node in a blockchain network, and the device includes: a request receiving unit, configured to receive an account creation request of a user, where the account creation request includes a key control rule defined by the user, and the key control rule includes at least one 3-tuple, and each 3-tuple includes a key identifier, an action identifier, and a permission setting; and a first-transaction sending unit, configured to send a first transaction used to create an account, where the first transaction includes at least an initiator field, a receiver field, and a data field, the initiator field specifies a first account to be created, the receiver field specifies a pre-determined field value, and the data field specifies the key control rule.

According to a sixth aspect, a device for verifying a blockchain transaction is provided, where the device is deployed on a blockchain platform, the blockchain platform serves as a full node in a blockchain network, and the device includes: a second-transaction receiving unit, configured to receive a second transaction, where the second transaction includes at least an initiator field and an extension field, the initiator field specifies a first account, and the extension field specifies a first-action identifier corresponding to a first action involved in the second transaction; a key rule acquisition unit, configured to obtain a key control rule defined during creation of the first account, where the key control rule includes at least one 3-tuple, and each 3-tuple includes a key identifier, an action identifier, and a permission setting; a 3-tuple determining unit, configured to determine a first 3-tuple corresponding to the first-action identifier based on the key control rule; and a verification unit, configured to verify the second transaction based on at least the first 3-tuple.

According to a seventh aspect, a computer readable storage medium is provided, where the medium stores a computer program, and when the computer program is executed in a computer, the computer is enabled to perform the methods according to the first aspect to the third aspect.

According to an eighth aspect, a computing device is provided, including a memory and a processor, where the memory stores executable code, and when the processor executes the executable code, the methods according to the first aspect to the third aspect are implemented.

According to the methods and devices provided in the implementations of the present specification, a user can set a key control rule for keys of the user, and can add the key control rule to a transaction used to create an account. As such, a blockchain platform serving as a full node in a blockchain network can store the key control rule when creating an account. When the user initiates a subsequent transaction by using an account created by the user, the blockchain platform can verify the subsequent transaction based on the stored key control rule. As such, the user can perform refined management on keys, and improve security of transactions performed by the user by using the keys.

BRIEF DESCRIPTION OF DRAWINGS

To describe the technical solutions in the implementations of the present invention more clearly, the following briefly introduces the accompanying drawings required for describing the implementations. Clearly, the accompanying drawings in the following description are merely some implementations of the present invention, and a person of ordinary skill in the field may still derive other drawings from these accompanying drawings without creative efforts.

DESCRIPTION OF IMPLEMENTATIONS

The solution provided in this specification is described below with reference to the accompanying drawings.

Figure 1:
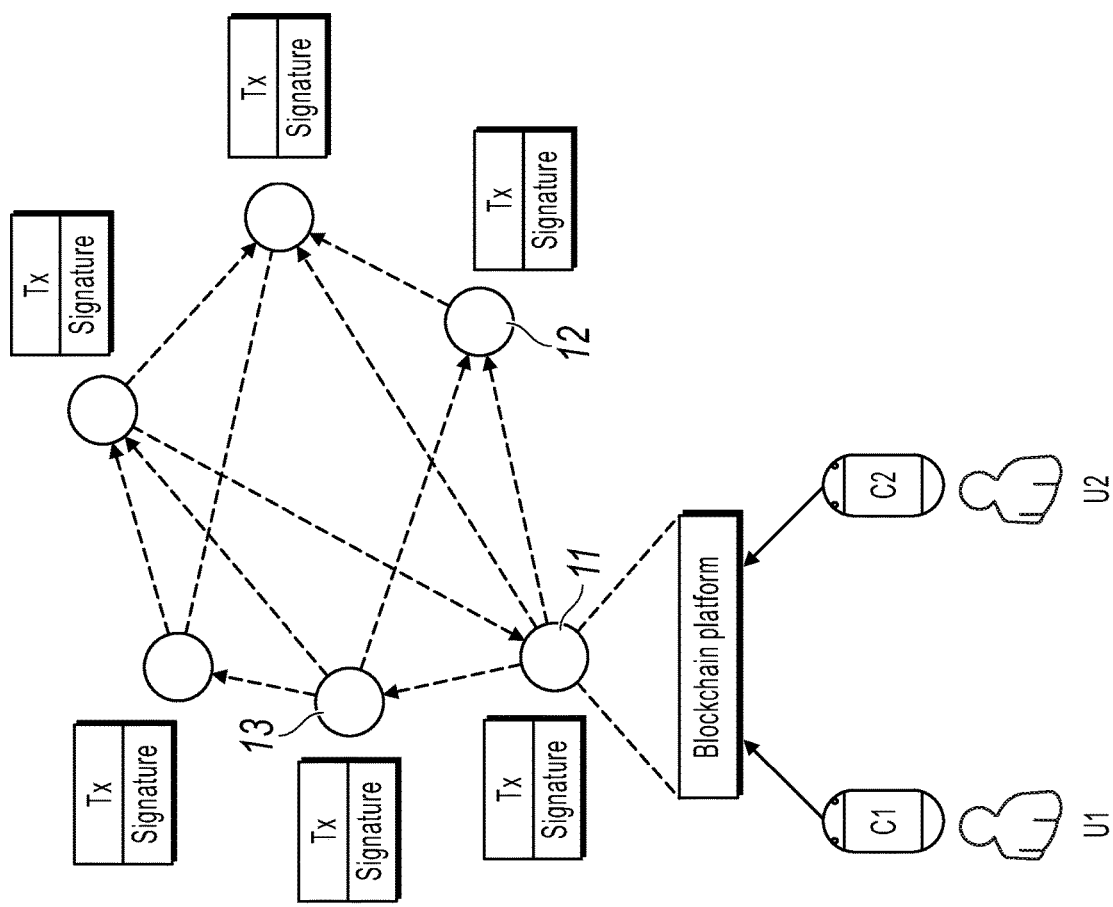
FIG. 1 is a schematic diagram illustrating a blockchain network system, according to an implementation of the present specification.

FIG. 1 is a schematic diagram illustrating a blockchain network system, according to an implementation of the present specification. As shown in FIG. 1, the system includes a plurality of full nodes that form a blockchain network (six full nodes are shown in the figure), and every two of these nodes are connected to each other. For example, node 11, node 12, and node 13 are connected to each other, the blockchain is a consortium blockchain, and each full node is a node that can participate in consensus in the consortium blockchain.

According to an implementation, a full node can be embodied as a blockchain platform, where the platform serves as a server to provide a blockchain network access service for end users. An end user can connect to the blockchain platform by using a client, for example, a blockchain-based wallet App, connect to a blockchain network through the blockchain platform, and the perform various blockchain transactions, such as a transfer transaction, a transaction used to create a smart contract, and transaction used to invoke a smart contract. Now, the client can also be considered as a lightweight node in a blockchain, and performs a transaction by relying on the full nodes. For example, in FIG. 1, user U1 and user U2 respectively connect to a full node 11 corresponding to the blockchain platform by using corresponding client C1 and client C2, and then perform transactions through the blockchain platform.

According to this implementation of the present specification, a user can set access control for keys of the user, the setting can be embodied as a 3-tuple (key id, action id, permission), and the 3-tuple forms a key control rule. When creating an account, the client can initiate a transaction used to create the account in response to a user request, and fill a data field of the transaction with the key control rule. As such, a blockchain platform serving as a full node in a blockchain network can store the key control rule when creating a corresponding account.

In addition, according to this implementation of the present specification, an extension field can be added in a transaction. After an account is created, when performing a subsequent transaction by using the account, the user can declare an action involved in the transaction in the extension field of the transaction. As such, the blockchain platform can verify the transaction based on the declaration in the extension field and the key control rule corresponding to the account, to verify the transaction, so as to implement key access control and improve transaction security.

The following describes a process for creating an account based on key access control and a process for verifying a transaction.

Figure 2:
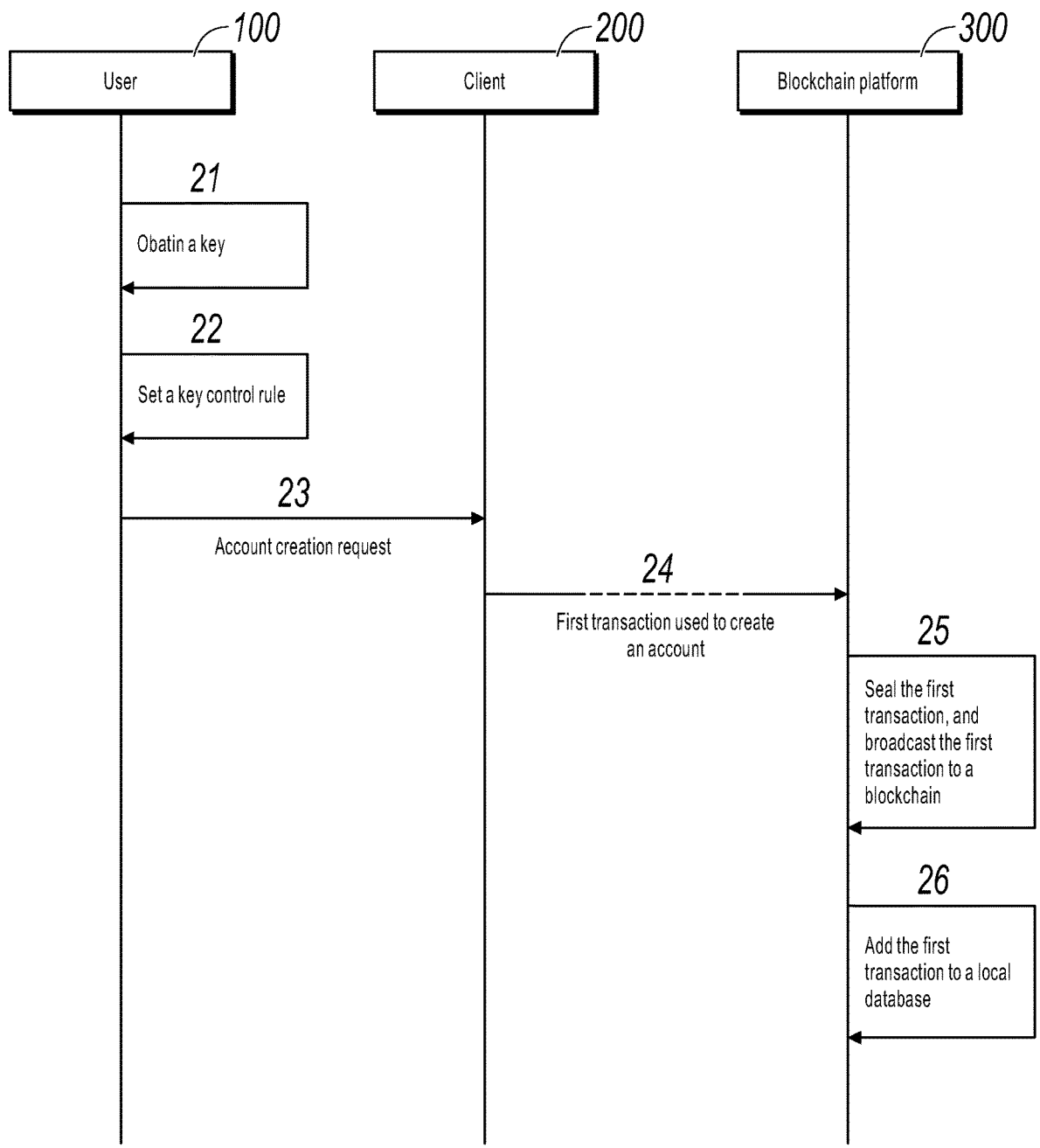
FIG. 2 is a flowchart illustrating creating of a blockchain account, according to an implementation.

FIG. 2 is a flowchart illustrating creating of a blockchain account, according to an implementation. As shown in FIG. 2, to create a blockchain account, at step 21, a user 100 obtains one or more key pairs, where each key pair includes a corresponding public key and a corresponding private key.

In an implementation, the user 100 can obtain a key as follows: The user can input a character string as a private key, where the character string is similar to a common user password. Then, the client uses an encryption algorithm to generate a public key based on the private key, so as to form a key pair. The user can obtain more key pairs in a similar way. In another implementation, a key can be obtained using another method. For example, a public key can be input to generate a private key, so as to obtain a key pair.

For the obtained one or more key pairs, at step 22, the user 100 can set key access control, that is, set a key control rule. In an implementation, a key control rule is embodied as a 3-tuple, and each 3-tuple includes a key identifier, an action identifier, and a permission setting, where the key identifier is used to indicate a key pair, the action identifier is used to indicate an action to be performed, and the permission setting is used to specify whether the previous action is permitted. In a specific example, the permission setting includes two options: permitted (yes) or not permitted (no). In another example, the permission setting can further include conditional permission, for example, permitted and a condition for the permission.

In a specific example, content of the key control rule is shown in Table 1.

TABLE 1

| Example of the key control rule | | |
|---|---|---|
| Key identifier | Action identifier | Permission setting |
| KeyID1 | ActionID1 | Yes |
| KeyID2 | ActionID2 | No |
| KeyID3 | ActionID3 | Yes |

It should be understood that Table 1 is only an example. The key control rule can include any quantity of 3-tuples, and the permission setting is not limited to the form of yes/no.

In an example, the key identifier is generated based on a public key in a key pair. For example, the key identifier can be the public key, or a section of the public key.

More specifically, in an example, specific corresponding content of the 3-tuple in the first row in the previous table is as follows:

KeyID 1:0xa24fghjfact67uadu
ActionID1: verify_transaction_signature (verifying transaction signature)
Yes That is, the 3-tuple defines that the operation of performing the action (verifying a transaction signature) defined in ActionID1 by using the private key defined in KeyID1 is permitted.

For another example, specific corresponding content of the second row in the previous table can be as follows:

KeyID2: 0fa78fa20oghdas
ActionID2: encrypt_transaction_with_pubkey (encrypting transaction with public key)
No The 3-tuple defines that the operation of encrypting the transaction by using the public key defined in KeyID2 is not permitted.

As such, the user can define the key control rule by using a 3-tuple.

Then, at step 23, the user 100 sends an account creation request to a client 200, where the account creation request can include a defined key control rule.

In response to the user request, at step 24, the user 200 sends a transaction used to create an account to a blockchain platform 300. For simplicity, the transaction is referred to as a first transaction.

It can be understood that in an existing blockchain architecture, various blockchain operations can be implemented as transactions. Table 2 shows example fields of a transaction.

TABLE 2

| Example fields of a transaction | |
|---|---|
| Tx-hash | Transaction hash value |
| Tx-type | Transaction type |

TABLE 2-continued

Example fields of a transaction

| Timestamp | Timestamp |
| From | Transaction initiator |
| To | Receiver |
| Value/amount | Amount |
| Data | Data |
| ... | ... |
| Signature | Signature |

With reference to Table 2, mandatory fields of the transaction include an initiator field (From), a receiver field (To), and a digital signature. The initiator field defines an address of a transaction initiator. The receiver field defines an address of a receiver account or an address of a smart contract (in a transaction used to invoke a smart contract). The digital signature is used to verify the transaction. Generally, the digital signature is obtained by encrypting transaction content by the transaction initiator by using a private key.

A transaction usually includes the value/amount field, which is used to define a transfer amount. Therefore, for a transfer operation, the field can be filled with a transfer amount.

A transaction further includes data fields. In an existing transaction form, the data field can usually include message data to be sent to a receiver. In a scenario in which a smart contract is involved, the data fields specifically include: code of a created smart contract, a parameter transferred to a smart contract during invocation of the smart contract, etc.

Optionally, the data fields in an Ethereum transaction further include Gas-related fields, a nonce field, etc.

According to an implementation of the present specification, when a user requests to create an account, the client 200 sends a first transaction used to create the account. To indicate that the first transaction is a transaction used to create the account, the receiver field of the first transaction can be a pre-determined field value, for example, null or a specified value, and the initiator field can be filled with the account to be created, which is referred to as a first account. The account address of the first account is usually generated based on a public key of the account.

Further, the data fields of the first transaction include a user-defined key control rule, and the key control rule includes at least one 3-tuple described above.

In an implementation, the client 200 codes the key control rule by following a pre-determined coding scheme, and fill the data field of the first transaction with the coded data in a corresponding format. For example, the pre-determined coding scheme can be Recursive Length Prefix (RLP) or protobuf.

As such, the client 200 generates the first transaction, and sends the first transaction to the blockchain platform 300, where the initiator field of the first transaction includes a first transaction to be created, the receiver field is a pre-determined value, and the data field specifies a user-defined key control rule.

Correspondingly, the blockchain platform 300 receives the previous first transaction used to create the account.

It can be understood that the blockchain platform 300 is a full node in the blockchain network, for example, the full node 11 in FIG. 1. During implementation, the blockchain platform 300 can be embodied as a device or device cluster that has computation and processing capabilities. In addition, the blockchain platform 300 can be any full node in the blockchain network. That is, the blockchain platform 300 can be a full node directly accessed by the client 200 (for example, the full node 11 in FIG. 1), or can be another full node (for example, the full node 12 in FIG. 1). Specifically, in an implementation, the client 200 can directly access the blockchain platform 300. In this case, the blockchain platform 300 receives the first transaction form the client. Alternatively, the blockchain platform 300 is not a full node that is not directly connected to the client 200. In this case, the client 200 sends a first message to a full node that is directly connected to the client 200, and then the full node forwards the first message to another node; as such, the blockchain platform 300 receives the first transaction that is formed by the another node in the blockchain network.

After receiving the first transaction, at step 25, the blockchain platform 300 seals the first transaction into a block, and sends the sealed first transaction to other full nodes in the blockchain network. In other words, the blockchain platform 300 can seal the first transaction into a block and broadcast the first transaction to the blockchain. This process can be implemented based on various general consensus algorithms. After information about the first transaction is added to the blockchain, each full node in the blockchain network can obtain the information about the first transaction, to obtain the first account created by the first transaction and the key control rule corresponding to the first account.

In addition, in an implementation, at step 26, the blockchain platform 300 further adds account content corresponding to an account identifier of the first account to a local account database, where the account content includes the key control rule.

It should be understood that each full node in the blockchain network can locally maintain an account database, which is used to record account content of each blockchain account. Generally, the account content in the account database can include an account ID, an account balance, account key information (a hash value of a key database), etc.

In an implementation of the present specification, when the blockchain platform 300 determines, based on the first transaction, that the first account needs to be created, the account content of the first account can be added to a local account database of the blockchain platform 300, where the account content includes a user-defined key control rule in addition to the previous general information.

According to an implementation, for example, the account database can be organized as a state tree. For example, the state tree is an MPT tree, and each leaf node of the MPT tree is the account content of each account, and each parent node includes at least one address character of the account and a hash value corresponding to all leaf nodes of the parent node. Of course, the account database is not limited to the form of an MPT tree. The account database can be in another form, for example, a Merkle tree or a Trie tree. In this case, after the account content of the first account is added, the blockchain platform 300 can correspondingly update the state tree of the account database of the blockchain platform 300.

It should be understood that, the execution order of step 26 is not limited to the order shown in FIG. 2. Alternatively, step 26 can be performed before or concurrently with step 25.

As such, with the method shown in FIG. 2, a blockchain account can be created, and the account has a corresponding user-defined key control rule, so that key access control can be checked.

Figure 3:
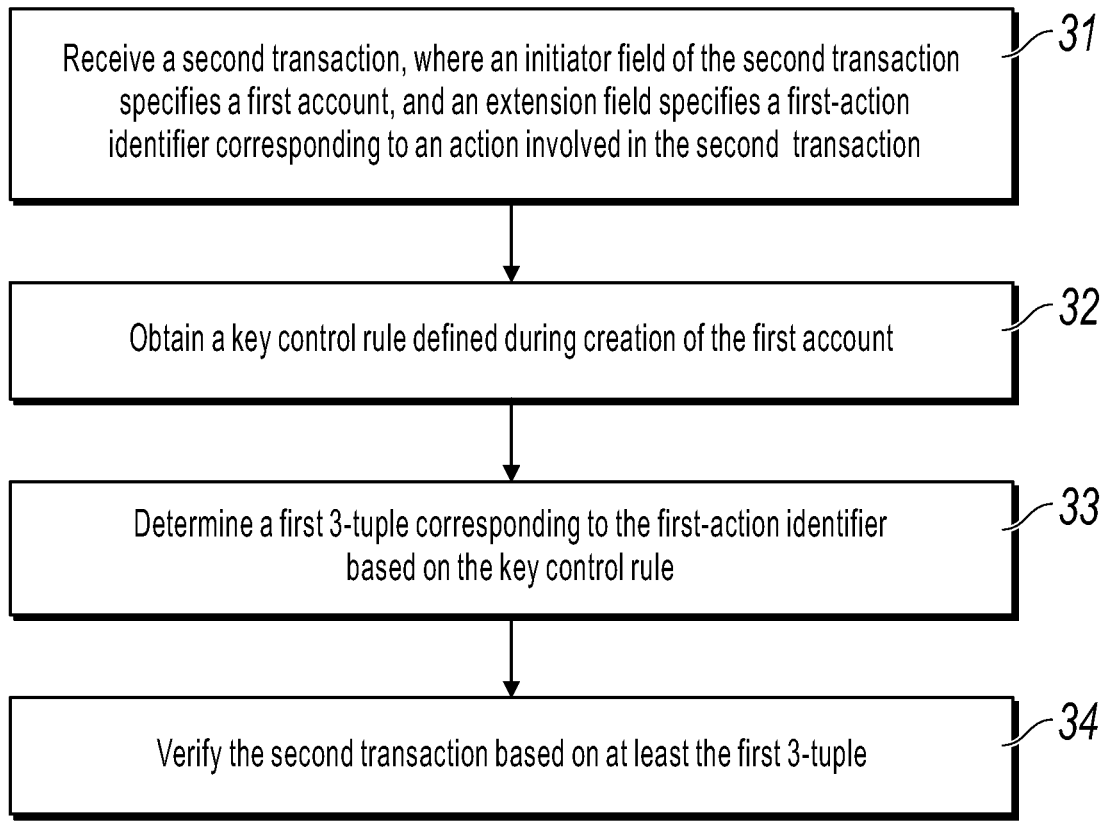
FIG. 3 is a flowchart illustrating a method for checking key access control during transaction verification.

FIG. 3 is a flowchart illustrating a method for checking key access control during transaction verification. The method process shown in FIG. 3 is performed by using blockchain platform.

As described above, a user can create an account based on a first transaction, that is, the previous first account, and define a key control rule specific to the first account. After the first account is created, the first account can be used to perform various transactions supported by the blockchain.

Assuming that the user initiates another transaction (which is referred to as a second transaction) after creating the first account, the second transaction can be a common transfer transaction, or can be a transaction of a specified type, for example, a transaction related to privacy protection or a mail encryption transaction.

It can be understood that an initiator field of the second transaction will include the created first account. According to an implementation, to support checking of key access control, an extension field is added based on the transaction content shown in Table 2. The extension field specifies an action identifier corresponding to an action involved in the second transaction.

In an implementation, a user can fill the extension field with an action identifier corresponding to an action involved in the transaction. Alternatively, in another implementation, a user can specify a transaction type of a second transaction to be initiated, and a client determine, based on a mapping between pre-determined transaction types and involved actions, an action identifier of an action involved in the second transaction, and fill the extension field with the action identifier.

In a specific implementation, a specific form of the extension field includes: {ActionID, extension-data, Action signature}, where ActionID indicates the action identifier of an action involved in the transaction; extension-data indicates the extension data; and "Action signature" indicates a digital signature of the extension field.

In an implementation, the action signature is obtained as follows: The character string formed by the fields before "Action signature" (including ActionID and extension-data) is hashed to obtain a digest; and then the digest is encrypted by using a private key in a key pair corresponding to ActionID in the key access control 3-tuple, to obtain the action signature.

The client sends the second transaction including the extension field to the connected blockchain platform.

As such, as shown in step 31 in FIG. 3, the blockchain platform receives the second transaction, where the initiator field of the second transaction includes the first account, and the extension field specifies the action identifier corresponding to the action involved in the second transaction. For simplicity, the action involved in the second transaction is referred to as a first action, and the corresponding action identifier is referred to as a first-action identifier.

Similar to receiving the first transaction in FIG. 2, when the blockchain platform is a full node directly accessed by the client, the blockchain platform can receive the second transaction from the client; otherwise, the blockchain platform can receive the second transaction from another node in the blockchain network.

Next, at step 32, the blockchain platform obtains the key control rule defined during creation of the first account. Specifically, the blockchain platform can first extract the first account from the initiator field of the second transaction, and then obtain the key control rule corresponding to the first account.

In an implementation, the blockchain platform can obtain, from a blockchain, a first transaction that has been previously used to create the first account, and read a key control rule from a data field of the first transaction. It can be understood that each transaction in the blockchain network will be recorded in blocks. Based on step 25 in FIG. 2, the first transaction used to create the first account is broadcast to the blockchain, and then each node in the blockchain network can read the transaction content of each transaction from corresponding blocks, to obtain the key control rule corresponding to the first account.

Alternatively, in another implementation, the blockchain platform can read account content corresponding to an account identifier of the first account from a local account database, where the account content includes the key control rule. As shown in step 26 in FIG. 2, the blockchain platform can record the account content of the first account in the local account database of the blockchain platform. As such, for a subsequent transaction initiated by the first account, the blockchain platform can quickly obtain the account content of the first account from the local account database, including the defined key access rule.

As described above, the key control rule includes at least one 3-tuple, and each 3-tuple includes a key identifier, an action identifier, and a permission setting. As such, next, at step 33, the blockchain platform can determine, based on 3-tuple of the key control rule corresponding to the first account, a 3-tuple corresponding to an identifier in the first row of the extension field of the second transaction, which is referred to as the first 3-tuple. In other words, a 3-tuple including the first action identifier is determined, based on the at least one 3-tuple obtained in step 32, and the obtained 3-tuple is used as the first 3-tuple.

Of course, if the first action identifier cannot be found in the key control rule, it means that the user has not perform permission setting for the corresponding first action, and the verification process can be ended. The following description based on a scenario in which the first action identifier is found and the first 3-tuple is determined.

When the first 3-tuple is determined, at step 34, the second transaction is verified based on at least the first 3-tuple.

In an implementation, the extension field specifies a field signature. For example, the field signature is in the following format: [ActionID, extension-data, Action signature}. In this case, authenticity of the extension field can be first verified based on the field signature; and after the extension field is verified successfully, permission of the first action involved in the second transaction is verified based on the first 3-tuple.

Specifically, to verify the extension field, the field values before the field signature (including the first action identifier ActionID and extension-data) are hashed again to obtain a digest, which is referred to as the first digest. In addition, a public key corresponding to the key identifier in the first 3-tuple is obtained. It can be understood that the public key in each key pair of the account is known to each blockchain node. Therefore, a corresponding public key (also referred to as a first public key) can be obtained based on the key identifier in the first 3-tuple. Then, the field signature is encrypted by using the first public key, to obtain a second digest. The first digest and the second digest are compared. If the first digest and the second digest are the same, the extension field is authentic, accurate, and not tampered with, and the extension field is verified successfully. Otherwise, it is possible that the extension is not authentic and needs to be further verified.

When the extension field is verified successfully, the first action is verified based on the first 3-tuple. Specifically, permission setting content in the first 3-tuple can be obtained. If the permission setting content indicates that the first action is permitted, for example, the permission setting is "Yes", it is determined that the first action is verified successfully, and then the second transaction is verified successfully. Of course, next, other aspects of the second transaction may be verified.

If the permission setting content indicates that the first action is not permitted, for example, the permission setting is "No", it is determined that the first action fails to be verified, and then the second transaction fails to be verified. If the permission setting content is conditional, further, it is determined whether the condition is satisfied, and then it is determined whether the first action is verified successfully.

In a specific implementation, the extension field does not include the field signature. In this case, permission of the first action can be directly performed based on the 3-tuple, to verify the first action.

In an implementation, the extension field can include a plurality of action identifiers corresponding to a plurality of actions involved in the second transaction. In this case, for each of the plurality of action identifiers, a corresponding first 3-tuple is determined, and the previous verification process is performed.

In an implementation, when the first action fails to be verified and thus the second transaction fails to be verified, prompt information is returned to the client that initiates the second transaction, where the prompt information is used to notify the user that the second transaction fails to be verified and fails to be broadcast to the blockchain. Then, the user can modify the transaction content of the second transaction and re-initiate the transaction.

According to the previous process, a user can set a key control rule for keys of the user, and can add the key control rule to a transaction used to create an account. As such, a blockchain platform serving as a full node in a blockchain network can store the key control rule when creating an account. When the user initiates a subsequent transaction by using an account created by the user, the blockchain platform can verify the subsequent transaction based on the stored key control rule. As such, the user can perform refined management on keys, and improve security of transactions performed by the user by using the keys.

Figure 4:
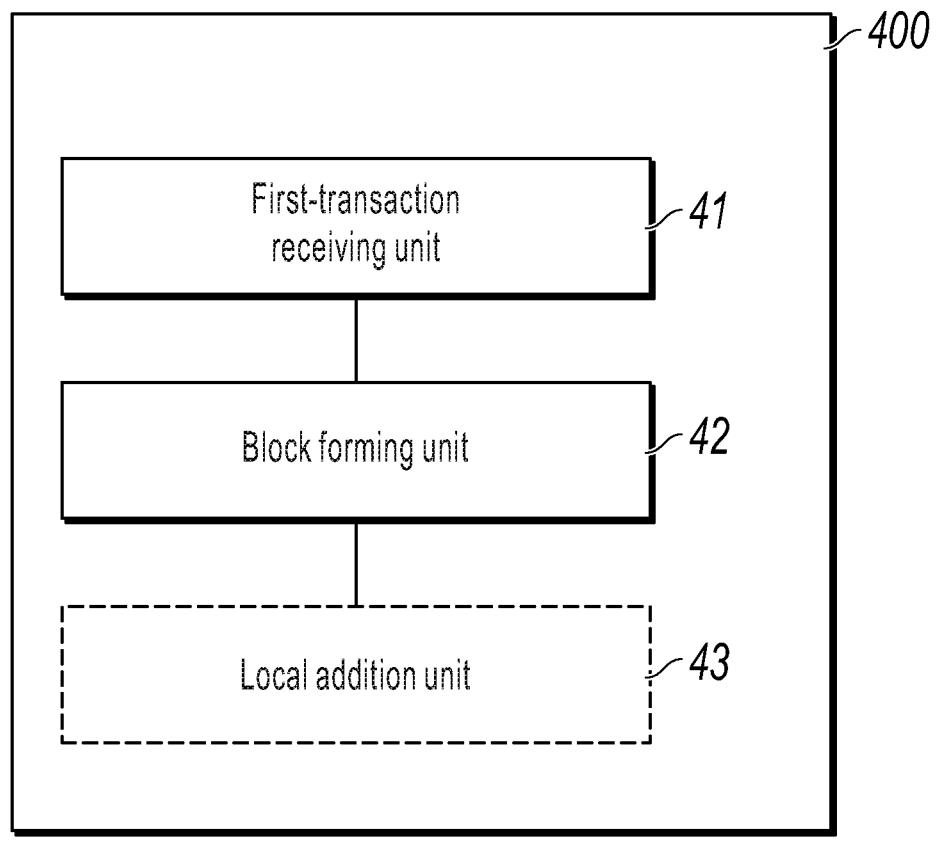
FIG. 4 is a schematic block diagram illustrating a device for creating a blockchain account that is deployed on a blockchain platform, according to an implementation.

According to an implementation of another aspect, a device for creating a blockchain account is provided, where the device is deployed on a blockchain platform, the blockchain platform serves as a full node in a blockchain network, and the device can be implemented as a device or device cluster that has computation and processing capabilities. FIG. 4 is a schematic block diagram illustrating a device for creating a blockchain account that is deployed on a blockchain platform, according to an implementation. As shown in FIG. 4, the device 400 includes: a first-transaction receiving unit 41, configured to receive a first transaction used by a user to create an account, where the first transaction includes at least an initiator field, a receiver field, and a data field, the initiator field specifies a first account to be created, the receiver field specifies a pre-determined field value, and the data field specifies a user-defined key control rule, the key control rule includes at least one 3-tuple, and each 3-tuple includes a key identifier, an action identifier, and a permission setting; and a block forming unit 42, configured to seal the first transaction into a block, and send the sealed first transaction to at least one of other full nodes in the blockchain network.

In an implementation, the first-transaction receiving unit 41 is configured to: receive the second transaction from a client; or receive the second transaction from another node in the blockchain network.

According to an implementation, the device 400 further includes a local addition unit 43, configured to add account content corresponding to an account identifier of the first account to a local account database, where the account content includes the key control rule.

In an implementation, the key identifier in the 3-tuple is used to identify a key pair, the key pair includes one corresponding public key and one corresponding private key, and the key identifier is generated based on the public key.

According to an implementation, the key control rule in the data field of the first transaction is in a format specified by a pre-determined coding scheme.

Figure 5:
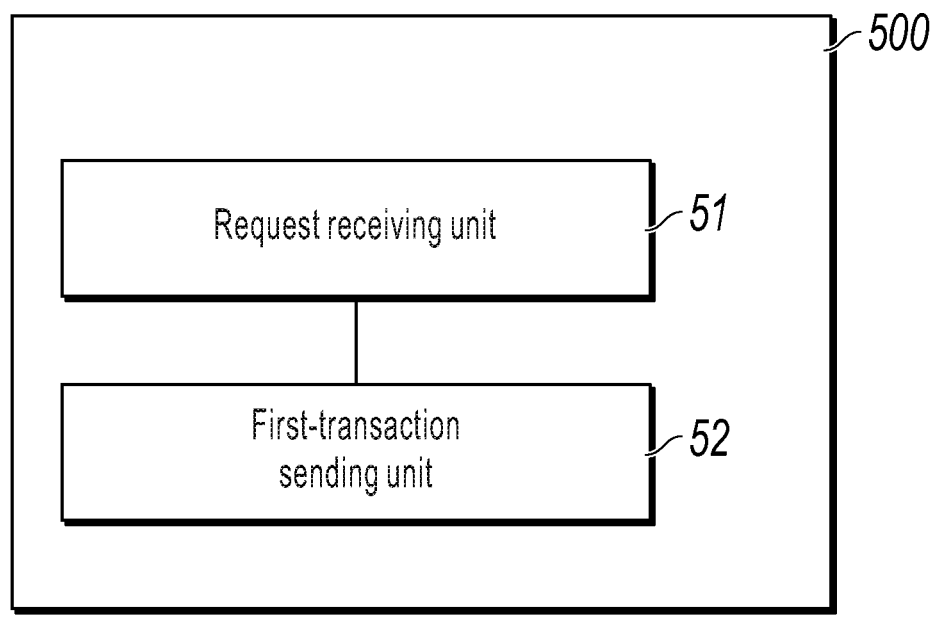
FIG. 5 is a schematic block diagram illustrating a device for creating a blockchain account that is deployed at a client, according to an implementation.

According to an implementation of still another aspect, a device for creating a blockchain account is provided, where the device is deployed at a client, and the client is connected to a blockchain platform serving as a full node in a blockchain network. FIG. 5 is a schematic block diagram illustrating a device for creating a blockchain account that is deployed at a client, according to an implementation. As shown in FIG. 5, the device 500 includes: a request receiving unit 51, configured to receive an account creation request of a user, where the account creation request includes a key control rule defined by the user, and the key control rule includes at least one 3-tuple, and each 3-tuple includes a key identifier, an action identifier, and a permission setting; and a first-transaction sending unit 52, configured to send a first transaction used to create an account, where the first transaction includes at least an initiator field, a receiver field, and a data field, the initiator field specifies a first account to be created, the receiver field specifies a pre-determined field value, and the data field specifies the key control rule.

In an implementation, the first-transaction sending unit 52 is configured to: before sending a first transaction used to create an account, code the key control rule by following a pre-determined coding scheme; and fill the data field of the first transaction with the coded data in a pre-determined format.

Figure 6:
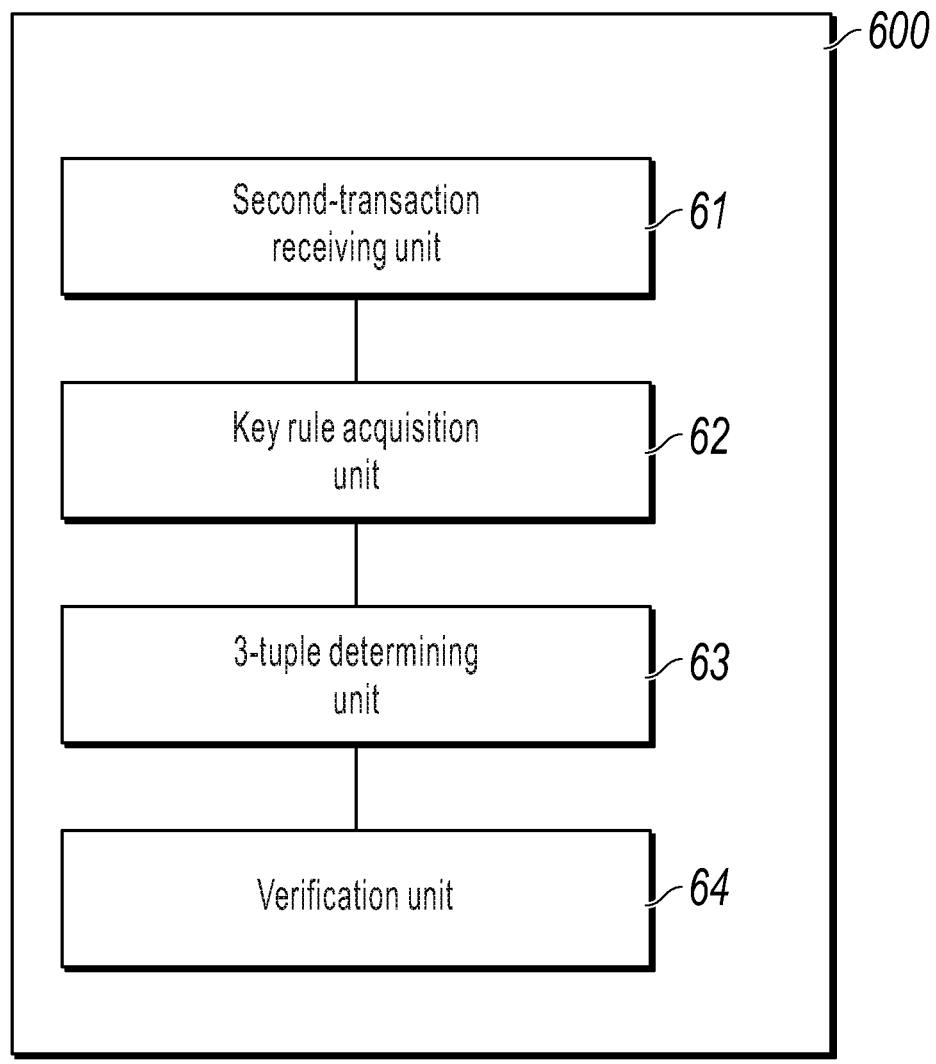
FIG. 6 is a schematic block diagram illustrating a device for verifying a blockchain transaction that is deployed on a blockchain platform, according to an implementation.

According to an implementation of another aspect of the present specification, a device for creating a blockchain account is provided, where the device is deployed on a blockchain platform, the blockchain platform serves as a full node in a blockchain network, and the device can be implemented as a device or device cluster that has computation and processing capabilities. FIG. 6 is a schematic block diagram illustrating a device for verifying a blockchain transaction that is deployed on a blockchain platform, according to an implementation. As shown in FIG. 6, the device 600 includes: a second-transaction receiving unit 61, configured to receive a second transaction, where the second transaction includes at least an initiator field and an extension field, the initiator field specifies a first account, and the extension field specifies a first-action identifier corresponding to a first action involved in the second transaction; a key rule acquisition unit 62, configured to obtain a key control rule defined during creation of the first account, where the key control rule includes at least one 3-tuple, and each 3-tuple includes a key identifier, an action identifier, and a permission setting; a 3-tuple determining unit 63, configured to determine a first 3-tuple corresponding to the first-action identifier based on the key control rule; and a verification unit 64, configured to verify the second transaction based on at least the first 3-tuple.

In an implementation, the second-transaction receiving unit 61 is configured to: receive the second transaction from a client; or receive the second transaction from another node in the blockchain network.

In an implementation, the key rule acquisition unit 62 is configured to obtain, from a blockchain, a first transaction that has been previously used to create the first account, and read the key control rule from a data field of the first transaction; or read account content corresponding to an account identifier of the first account from a local account database, where the account content includes the key control rule.

According to an implementation, a verification unit 64 (not shown) includes a first verification module and a second verification module, where the first verification module is configured to verify the extension field based on the first 3-tuple, and the second verification module is configured to: when the extension field is verified successfully, verify the first action based on the first 3-tuple.

In an implementation, the extension field further includes extension data and a field signature, and correspondingly, the first verification module is configured to: obtain a first public key corresponding to a first public key identifier in a first 3-tuple; and verify a field signature in the extension field by using the first public key.

In a further implementation, the first verification module is configured to: calculate a first digest of the first-action identifier and the extension data; encrypt the field signature by using the first public key, to obtain a second digest; and compare the first digest and the second digest, and determine that the field signature is verified successfully when the first digest and the second digest are the same.

In an implementation, the verification unit 64 is specifically configured to: obtain the permission setting content in the first 3-tuple; and when the permission setting content indicates that the first action is not permitted, determine that the first action fails to be verified and that the second transaction fails to be verified.

According to an implementation, the device 600 further includes a prompting unit (not shown), configured to: when the second transaction fails to be verified, return prompt information to the client that initiates the second transaction.

Based on the previous device, a blockchain account with a defined key control rule can be created, and a blockchain transaction can be verified based on the key control rule.

According to an implementation of another aspect, a computer readable storage medium is further provided, where the computer readable storage medium stores a computer program, and when the computer program is executed in a computer, the computer is enabled to perform the methods described with reference to FIG. 2 and FIG. 3.

According to an implementation of yet another aspect, a computing device is further provided, including a memory and a processor, where the memory stores executable code, and when the processor executes the executable code, the methods described with reference to FIG. 2 and FIG. 3 are implemented.

A person skilled in the field should be aware that, in one or more of the above examples, the functions described in the present invention can be implemented by using hardware, software, firmware, or any combination of them. When these functions are implemented by software, they can be stored in a computer readable medium or transmitted as one or more instructions or code lines on the computer readable medium.

The specific implementations mentioned above further describe the object, technical solutions and beneficial effects of the present invention. It should be understood that the previous descriptions are merely specific implementations of the present invention and are not intended to limit the protection scope of the present invention. Any modification, equivalent replacement and improvement made on the basis of the technical solution of the present invention shall fall within the protection scope of the present invention.

What is claimed is:

1. A method comprising:
receiving, by a blockchain platform serving as a full node in a blockchain network, a first transaction for creating a blockchain account, the first transaction comprising at least an initiator field that specifies the blockchain account to be created, and a data field that specifies a user-defined key control rule, wherein the user-defined key control rule specified in the data field comprises at least one tuple, and each tuple comprises a key identifier, an action identifier that indicates an action to be performed, and a permission setting that specifies whether the action indicated by the action identifier is permitted, wherein the key identifier is used to identify a key pair, the key pair comprising one public key and one private key, the key identifier having been generated based on the public key;
sealing, by the blockchain platform, the first transaction into a block;
sending, by the blockchain platform, the sealed first transaction to at least one other full node in the blockchain network, thereby creating the blockchain account;
after the blockchain account has been created, receiving, by the blockchain platform, a second transaction, the second transaction comprising at least an initiator field that specifies the created blockchain account, and an extension field that includes a first-action identifier corresponding to a first action involved in the second transaction, extension data, and a digital signature of the extension field;
obtaining, by the blockchain platform, the user-defined key control rule defined during creation of the blockchain account;
determining, by the blockchain platform, a first tuple corresponding to the first-action identifier based on the user-defined key control rule;
verifying, by the blockchain platform, the second transaction based on at least the first tuple, wherein verifying the second transaction comprises:
calculating a first digest of the first-action identifier and the extension data;
obtaining a first public key corresponding to a first key identifier in the first tuple;
encrypting the digital signature of the extension field by using the first public key, to obtain a second digest;
comparing the first digest and the second digest; and
in response to determining that the first digest and the second digest are the same, verifying the first action based on the first tuple, wherein verifying the first action comprises:
obtaining permission setting content in the first tuple; and
in response to the permission setting content indicating that the first action is not permitted, determining that the first action is not successfully verified and that the second transaction is not successfully verified; and
in response to determining that the second transaction is not successfully verified, returning prompt information to a client that initiated the second transaction, wherein the prompt information provides a notification that the second transaction has not been successfully verified.

2. The method according to claim 1, wherein the first transaction is received by the blockchain platform from a client that initiated the first transaction.

3. The method according to claim 2, wherein the client that initiated the first transaction is configured to perform operations comprising:
receiving an account creation request of a user, wherein the account creation request comprises the user-defined key control rule;
coding the user-defined key control rule by following a pre-determined coding scheme; and
filling the data field of the first transaction with the coded user-defined key control rule in a pre-determined format.

4. The method according to claim 1, wherein the first transaction is received by the blockchain platform from another node in the blockchain network.

5. The method according to claim 1, further comprising:
adding account content corresponding to an account identifier of the blockchain account to a local account database, wherein the account content comprises the user-defined key control rule.

6. The method according to claim 1, wherein the second transaction is received by the blockchain platform from the client that initiated the second transaction, or from another node in the blockchain network.

7. The method according to claim 1, wherein obtaining the user-defined key control rule comprises:
obtaining, from the blockchain network, the first transaction that had been previously used to create the blockchain account; and
reading the user-defined key control rule from the data field of the first transaction.

8. The method according to claim 1, wherein obtaining the user-defined key control rule comprises:
reading account content corresponding to an account identifier of the blockchain account from a local account database, wherein the account content comprises the user-defined key control rule.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving, by a blockchain platform serving as a full node in a blockchain network, a first transaction for creating a blockchain account, the first transaction comprising at least an initiator field that specifies the blockchain account to be created, and a data field that specifies a user-defined key control rule, wherein the user-defined key control rule specified in the data field comprises at least one tuple, and each tuple comprises a key identifier, an action identifier that indicates an action to be performed, and a permission setting that specifies whether the action indicated by the action identifier is permitted, wherein the key identifier is used to identify a key pair, the key pair comprising one public key and one private key, the key identifier having been generated based on the public key;
sealing, by the blockchain platform, the first transaction into a block;
sending, by the blockchain platform, the sealed first transaction to at least one other full node in the blockchain network, thereby creating the blockchain account;
after the blockchain account has been created, receiving, by the blockchain platform, a second transaction, the second transaction comprising at least an initiator field that specifies the created blockchain account, and an extension field that includes a first-action identifier corresponding to a first action involved in the second transaction, extension data, and a digital signature of the extension field;
obtaining, by the blockchain platform, the user-defined key control rule defined during creation of the blockchain account;
determining, by the blockchain platform, a first tuple corresponding to the first-action identifier based on the user-defined key control rule;
verifying, by the blockchain platform, the second transaction based on at least the first tuple, wherein verifying the second transaction comprises:
calculating a first digest of the first-action identifier and the extension data;
obtaining a first public key corresponding to a first key identifier in the first tuple;
encrypting the digital signature of the extension field by using the first public key, to obtain a second digest;
comparing the first digest and the second digest; and
in response to determining that the first digest and the second digest are the same, verifying the first action based on the first tuple, wherein verifying the first action comprises:
obtaining permission setting content in the first tuple; and
in response to the permission setting content indicating that the first action is not permitted, determining that the first action is not successfully verified and that the second transaction is not successfully verified; and
in response to determining that the second transaction is not successfully verified, returning prompt information to a client that initiated the second transaction, wherein the prompt information provides a notification that the second transaction has not been successfully verified.

10. The computer-implemented system according to claim 9, the operations further comprising:
adding account content corresponding to an account identifier of the blockchain account to a local account database, wherein the account content comprises the user-defined key control rule.

11. The computer-implemented system according to claim 9, wherein obtaining the user-defined key control rule comprises:
obtaining, from the blockchain network, the first transaction that had been previously used to create the blockchain account; and
reading the user-defined key control rule from the data field of the first transaction.

12. The computer-implemented system according to claim 9, wherein obtaining the user-defined key control rule comprises:
reading account content corresponding to an account identifier of the blockchain account from a local account database, wherein the account content comprises the user-defined key control rule.

13. A non-transitory, computer-readable medium storing one or more instructions executable by a computer system to perform operations comprising:

receiving, by a blockchain platform serving as a full node in a blockchain network, a first transaction for creating a blockchain account, the first transaction comprising at least an initiator field that specifies the blockchain account to be created, and a data field that specifies a user-defined key control rule, wherein the user-defined key control rule specified in the data field comprises at least one tuple, and each tuple comprises a key identifier, an action identifier that indicates an action to be performed, and a permission setting that specifies whether the action indicated by the action identifier is permitted, wherein the key identifier is used to identify a key pair, the key pair comprising one public key and one private key, the key identifier having been generated based on the public key;

sealing, by the blockchain platform, the first transaction into a block;

sending, by the blockchain platform, the sealed first transaction to at least one other full node in the blockchain network, thereby creating the blockchain account;

after the blockchain account has been created, receiving, by the blockchain platform, a second transaction, the second transaction comprising at least an initiator field that specifies the created blockchain account, and an extension field that includes a first-action identifier corresponding to a first action involved in the second transaction, extension data, and a digital signature of the extension field;

obtaining, by the blockchain platform, the user-defined key control rule defined during creation of the blockchain account;

determining, by the blockchain platform, a first tuple corresponding to the first-action identifier based on the user-defined key control rule;

verifying, by the blockchain platform, the second transaction based on at least the first tuple, wherein verifying the second transaction comprises:

calculating a first digest of the first-action identifier and the extension data;

obtaining a first public key corresponding to a first key identifier in the first tuple;

encrypting the digital signature of the extension field by using the first public key, to obtain a second digest;

comparing the first digest and the second digest; and in response to determining that the first digest and the second digest are the same, verifying the first action based on the first tuple, wherein verifying the first action comprises:

obtaining permission setting content in the first tuple; and in response to the permission setting content indicating that the first action is not permitted, determining that the first action is not successfully verified and that the second transaction is not successfully verified; and in response to determining that the second transaction is not successfully verified, returning prompt information to a client that initiated the second transaction, wherein the prompt information provides a notification that the second transaction has not been successfully verified.

14. The computer-readable medium according to claim 13, the operations further comprising:

adding account content corresponding to an account identifier of the blockchain account to a local account database, wherein the account content comprises the user-defined key control rule.

15. The computer-readable medium according to claim 13, wherein obtaining the user-defined key control rule comprises:

obtaining, from the blockchain network, the first transaction that had been previously used to create the blockchain account; and reading the user-defined key control rule from the data field of the first transaction.

16. The computer-readable medium according to claim 13, wherein obtaining the user-defined key control rule comprises:

reading account content corresponding to an account identifier of the blockchain account from a local account database, wherein the account content comprises the user-defined key control rule.

\* \* \* \* \*